US007315977B2

(12) United States Patent (10) Patent No.: US 7,315,977 B2
Cox et al. (45) Date of Patent: Jan. 1, 2008

(54) STORING, UPDATING, AND REPORTING ON MIGRATION DATA USING AUTOMATED AGENTS

(75) Inventors: Gregory F. Cox, Friendswood, TX (US); Joseph I. Greenbaum, Ballston Lake, NY (US); Scott D. Hicks, Underhill Center, VT (US); William R. Kittel, Warwick, NY (US); James A. Martin, Jr., Endicott, NY (US); Steven Nigro, Las Vegas, NV (US); Thomas G. Sveda, Jr., Winston-Salem, NC (US); James T. Swantek, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 10/933,642

(22) Filed: Sep. 2, 2004

(65) Prior Publication Data

US 2006/0048050 A1 Mar. 2, 2006

(51) Int. Cl.
*G06F 15/00* (2006.01)
(52) U.S. Cl. ......................... 715/500; 705/8
(58) Field of Classification Search ................ 715/500, 715/502–504; 705/7–8
See application file for complete search history.

(56) References Cited

U.S. PATENT DOCUMENTS

| 5,655,118 | A | 8/1997 | Heindel et al. | .......... 707/103 R |
| 5,907,490 | A | 5/1999 | Oliver | ........................ 700/90 |
| 6,151,608 | A | * | 11/2000 | Abrams | ....................... 707/204 |
| 6,256,651 | B1 | * | 7/2001 | Tuli | ............................ 715/526 |
| 6,519,763 | B1 | | 2/2003 | Kaufer et al. | ............... 717/101 |
| 2002/0010808 | A1 | * | 1/2002 | Wiggins et al. | ............. 709/328 |
| 2002/0077877 | A1 | | 6/2002 | Oliver | .......................... 705/8 |
| 2003/0135481 | A1 | | 7/2003 | Helmes et al. | .................. 707/1 |
| 2003/0187748 | A1 | | 10/2003 | Kumhyr et al. | ............... 705/26 |
| 2004/0030590 | A1 | | 2/2004 | Swan et al. | ..................... 705/7 |
| 2004/0030992 | A1 | | 2/2004 | Moisa et al. | ................. 715/513 |
| 2005/0010463 | A1 | * | 1/2005 | Du et al. | ........................ 705/8 |

OTHER PUBLICATIONS

"The Cost of Migrating From Microsoft Exchange v5.5 to v2000", A White paper by Ferris Research, http://www.process.com/tcpip/ferris.pdf, Bindview, Apr. 2002.*

* cited by examiner

*Primary Examiner*—Cesar B Paula
(74) *Attorney, Agent, or Firm*—Schmeiser, Olsen & Watts; John R. Pivnichny

(57) ABSTRACT

A method and system for displaying and reporting project completion information of a large-scale project having a number of individual subprojects. A rollup agent is employed for acquiring project completion information from a number of subproject databases to provide overall project-wide display and reporting capabilities. The rollup agent collects and organizes the information, and stores it on a rollup database. The rollup agent also interacts with a user to select aspects of any subprojects to report or display. The rollup agent then creates and stores reports of the selected information, or displays the report interactively as a pop-up summary report or a spreadsheet format report to a user. A number of scheduled agents provide scheduled reporting at the subproject level. A number of on demand agents provides the interactive database view, pop-up reporting and spreadsheet reporting for each of the individual subprojects.

1 Claim, 10 Drawing Sheets

FIG. 6

| Project | Building | Type | Usage | Comp. | No Mig. | No Mig. No Resp. | Remain. | Total |
|---|---|---|---|---|---|---|---|---|
| A000392 | | | | 3618 | 77 | 0 | 17 | 3712 |
| A001086 | | | | 1001 | 9 | 0 | 101 | 1113 |

Earned Value Measurements

Earned Value Measurements
(PTD up to current billing month)

Project: A000392

| | |
|---|---|
| Total seats migrated (EV#1010): | 1,139 |
| Total ports in project (EV#1015): | 2,000 |
| Total ports requiring migration (EV#1020): | 1,923 |
| Total ports migrated (EV#1025): | 3,617 |
| Totla clients migrated (EV#1085): | 2,011 |
| Total clients migrated (EV#1115): | 138 |
| % Inventory completed (EV#1117): | 185.6% |

[Print Results]

601

☐ PROBLEM RESOLUTION: 06P4007 and

FIG. 7

| | A | B | C | D | E | F | G | H | I | J |
|---|---|---|---|---|---|---|---|---|---|---|
| | C:\Documents and settings\Adminstrator\Local Settings\Temp\notes\EA312D\EV-2004-5-2.123] | | | | | | | | | _ □ X |
| | Ethernet Earned Value Metrics Report | | | | | | | | | |
| EVM | | | | | | | | | | |
| 1 | Ethernet Earned Value Metrics Report | | | | | | | | | |
| 2 | Run Date: 5/21/2004 | | | | | | | | | |
| 3 | Execution Year: 2004 | | | | | | | | | |
| 4 | Execution Month: 5 | | | | | | | | | |
| 5 | Execution Number 2 | | | | | | | | | |
| 6 | | | | | | | | | | |
| 7 | | | | | Metrics | | | | | |
| 8 | | 1010 | 1015 | 1020 | 1025 | 1085 | 1115 | 1117 | | |
| 9 | | | | | | | | | | |
| 10 | Projects: | | | | | | | | | |
| 11 | Unknown | 60 | 999999 | 999940 | 0 | 60 | 0 | 0.0% | | |
| 12 | A000060 | 916 | 1000 | 901 | 2906 | 2191 | 31 | 341.0% | | |
| 13 | A000392 | 1137 | 2000 | 1923 | 3615 | 2009 | 138 | 185.4% | | |
| 14 | A001086 | 206 | 1000 | 993 | 705 | 372 | 22 | 79.8% | | |
| 15 | | | | | | | | | | |
| 16 | Metric Number Definitions: | | | | | | | | | |
| 17 | 1010 = Total Seats Migrated | | | | | | | | | |
| 18 | 1015 = Total Project Ports | | | | | | | | | |
| 19 | 1020 = Ports Requiring Migration | | | | | | | | | |
| 20 | 1025 = Total Ports Migrated | | | | | | | | | |
| 21 | 1085 = Total Clients Migrated | | | | | | | | | |
| 22 | 1115 = Total Printers Migrated | | | | | | | | | |
| 23 | 1117 = Percent Inventory Completed | | | | | | | | | |

FIG. 8

Burlington: EMMDB - 15.0 Eared Value \ 15.01: PTD: All physical Inventory - Lotus Notes Address

| Welcome | Replication | James A. Martin - Sent | Workspace | WLM Weekly... | EMM Instanc... | Fw: Microsoft... | New Memo | Burlington: E.... |

Burlington: EMM DB
- 02.0 Ports
- 03.0 Machines
- 04.0 Adapters
- 05.0 Network
- 06.0 Scheduling
- 07.0 eMailed Inventory Process
- 08.0 Billing
- 09.0 Billing Readiness
- 10.0 Migration Views
- 11.0 Reporting
- 12.0 General
- 13.0 Administration
  - 13.01: System Configuration
  - 13.02: Adapter Mapping
  - 13.03: Administer Buildings
  - 13.04: Administer Floors
  - 13.05: Administer Machine C
  - 13.06: Marked for Deletion
  - 13.07: Supported Adapters
  - 13.08: Adapter Summary
  - 13.09: Replication Conflicts
  - 13.10: Billing Months
  - 13.11: Adapter and Cable C
  - 13.12: Inventory Managemen
  - 13.13: Inventory/Forecast A
  - 13.14: Import From File
  - 13.15: Forecast Managemen
  - 13.16: Administer Projects
  - 13.17: Administer Earned Va

801

Earned Value Execution Dates   Delete

| Execution Year | Execution Month | Execution Number | Execution Date |
|---|---|---|---|
| ▲ 2003 | | | |
| ▼ 2004 | | | |
| ▶ 1 | | 1 | 01/10/2004 |
| | | 2 | 01/24/2004 |
| ▶ 2 | | 1 | 02/07/2004 |
| | | 2 | 02/21/2004 |
| ▶ 3 | | 1 | 03/06/2004 |
| | | 2 | 03/27/2004 |
| ▶ 4 | | 1 | 04/10/2004 |
| | | 2 | 04/24/2004 |
| ▶ 5 | | 1 | 05/08/2004 |
| | | 2 | 05/22/2004 |
| ▶ 6 | | 1 | 06/05/2004 |
| | | 2 | 06/26/2004 |
| ▶ 7 | | 1 | 07/10/2004 |
| | | 2 | 07/24/2004 |
| ▶ 8 | | 1 | 08/07/2004 |
| | | 2 | 08/21/2004 |

STORING, UPDATING, AND REPORTING ON MIGRATION DATA USING AUTOMATED AGENTS

CROSS REFERENCE TO RELATED APPLICATIONS

This application is related to pending U.S. patent application entitled "METHOD AND SYSTEM FOR ENTERPRISE-WIDE MIGRATION" Ser. No. 10/728,520; filed Dec. 4, 2003, and hereby incorporates paragraphs [0014] through [0032] of such application by reference as if it were set forth in its entirety herein.

BACKGROUND OF THE INVENTION

1. Technical Field

The present invention relates to a system for project management, and more specifically, for a project management system for displaying and reporting completion status and overall performance of a project.

2. Related Art

In business, it is common to upgrade communications, information technology, and other systems on a large-scale basis. These systems typically employ a number of differing types of individual units in which the electronic hardware, software, or associated equipment must be replaced, updated, or have components added to them to change ("migrate") them to the new configuration. This migration involved differing processes and equipment to convert each of the different types of units. These projects may be implemented company-wide over many locations globally. It can become a large task to keep track of the overall progress of a project due to its complexity.

There have been some prior art devices which display project progress, but are not able to handle large multifaceted projects. There also have been systems which provide so much information that they are not readily understandable.

Currently, there currently is a need for a project reporting system capable of calculating and displaying project completion information for a large-scale project in an organized, understandable manner.

SUMMARY OF THE INVENTION

The present invention is a project reporting tool for reporting the progress of a large-scale project.

It employs a project reporting tool, comprising a number of subproject databases (DBs) for storing project completion information, a rollup database for storing information from the plurality of the subproject DBs, a plurality of scheduled agents, and a rollup agent. The scheduled agents a) acquire project completion information from the subproject DBs b) automatically generate subproject reports; c) display the acquired project completion information in a database view format.

The rollup agent is adapted to a) acquire project completion information from the plurality of subproject DBs, b) update the rollup database with the project completion information from the plurality of subproject DBs, c) automatically generate project-wide reports from the rollup database, and d) display the project completion information from the plurality of subproject DBs in a database view format.

The present invention may be implemented as a method of reporting project completion information executing the steps of: a) acquiring project completion information from a plurality of subproject databases (DBs); b) automatically generating subproject reports from the acquired project completion information; c) displaying the acquired project completion information in a database view format; d) updating a rollup database with extracted project completion information that has been extracted from the plurality of subproject DBs; e) automatically generating project-wide reports from the extracted project completion information; and f) displaying the extracted project completion information in a database view format.

The present invention may also be implemented as a computer program product, comprising a computer usable medium having computer readable program code embodied therein for displaying and reporting project completion information, said computer readable program code including an algorithm adapted to a) acquire project completion information from subproject databases; b) automatically generate subproject reports from the acquired project completion information; c) display the acquired project completion information in a database view format; d) update a rollup database with project completion information from a plurality of subproject databases; e) automatically generate project-wide reports from the project completion information; and f) display the project completion information in a database view format.

The present invention overcomes at least one disadvantage of the prior art, by providing a system that can display and report project-wide information in an organized, understandable manner.

BRIEF DESCRIPTION OF THE DRAWINGS

FIG. 6 shows a pop-up summary format report generated by the present invention.

FIG. 7 is a display of a sample spreadsheet format report generated according to the present invention.

FIG. 8 is another illustration of the display of the present invention showing a database view showing a screen input object.

DETAILED DESCRIPTION OF THE INVENTION

There are known criteria to measure progress of a large scale project, such as a migration. One specific measure of the project's progress is through the use of earned value (EV) measurements. This takes into account the value of the work completed with a reference to the value of the work originally planned.

Since the invention may be more clearly understood through a description of a specific embodiment, the remainder of the specification describes the present invention as applied to a large scale company-wide Ethernet migration, as an example.

Figure 1:
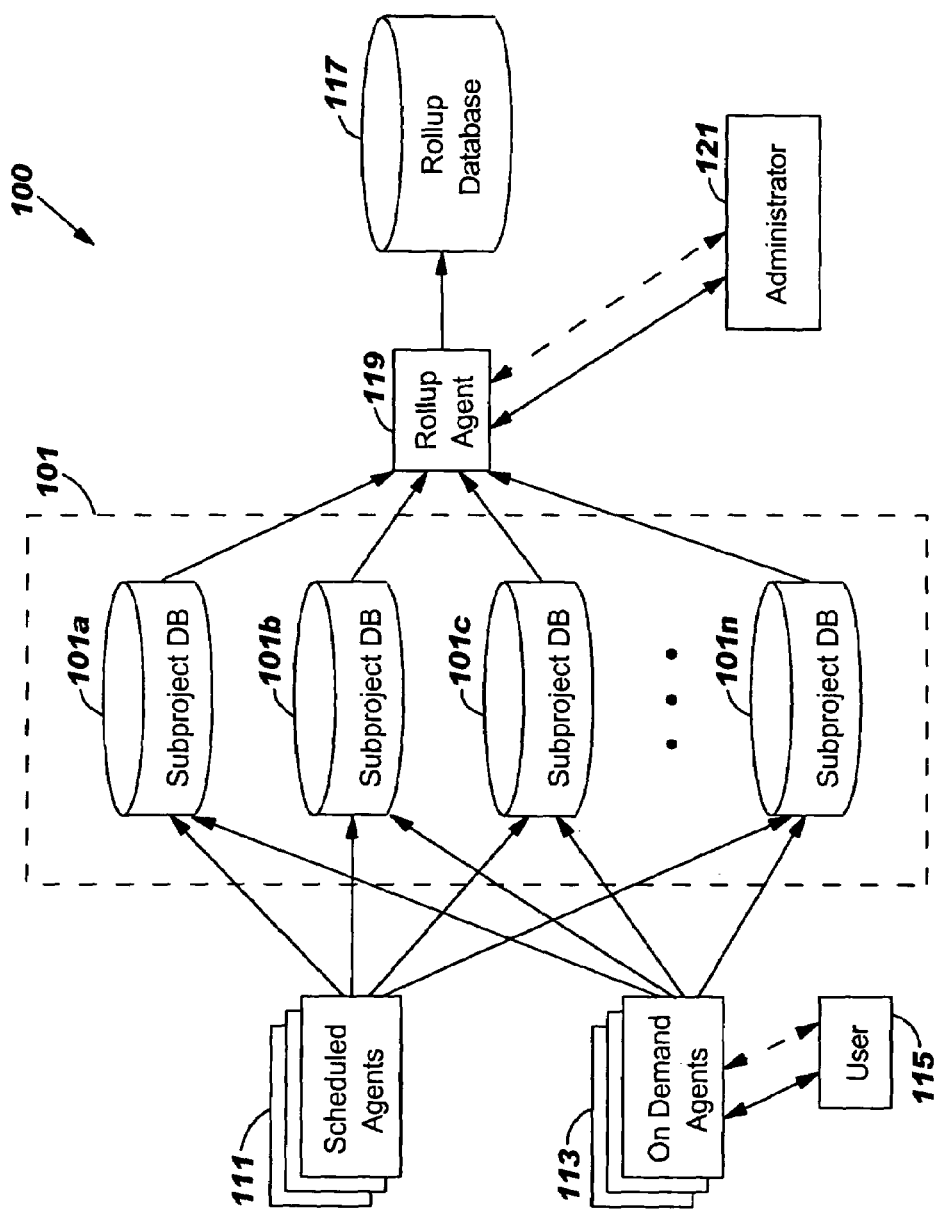
FIG. 1 illustrates a block diagram of the major portions of a system according to the present invention.

FIG. 1 shows a simplified block diagram of the present invention 100. Information regarding the migration project is stored on a plurality of subproject databases (DB) 101a, 101b, 101c . . . or 101n. The subproject DBs are collectively referred to as "subproject Dbs 101". The subproject DBs 101 physically may be located together, or they may be distributed at any number of locations and connected through an appropriate wired or wireless network.

These subproject DBs are updated with project completion information relating to a migration project preferably by a project manager of the team responsible for the project. Each project manager updates their appropriate subproject DB, populating it with information specific to their section of the project stored on subproject DB 101 as per the application referenced in "Cross Reference to Related Applications" above, of which a portion has been incorporated by reference here.

For the embodiment described here, information stored on the subproject DBs may include one or more of the following: project numbers, sites to migrate, building to migrate, total number of seats to migrate, total number of ports to migrate, total number of printers to migrate, total seats migrated, total ports migrated, total printers migrated, seats requiring migration, ports requiring migration, printers requiring migration, execution dates when each unit has been migrated, project planning information regarding timetables, milestones, resource estimates, estimates of equipment needed, financial, budget, and other migration project information.

This information is organized in a hierarchical structure having a plurality of hierarchy levels each having a plurality of entries. Each of these entries is broken down into information separated into a number of entries and a lower hierarchical level. Each of these entries is in turn broken down into a number of entries until one reaches an individual record which contains information about a single unit being migrated.

One or more of the scheduled agents 111 has been initialized with a set of predetermined execution date rules. The execution date rules identify dates ranges of the project, or projects, which are of interest for display or reporting.

Scheduled agent 111 is also initialized with an activation schedule in which scheduled agent 111 will periodically be activated. Scheduled agent 111 has also been initialized with project definition rules identifying aspects of project DB 101 on which to report. When scheduled, scheduled agent accesses the proper portions of the database according to the execution date rules and project definition rules. It then calculates project completion summaries for entries of the database as per the project definition rules. It may also compare the actual project completion information in a form such as earned value (EV) measurement, and stores these in a report for later use.

A user 115 interacts with one or more of the on demand agents 113 to indicate aspects of one or more projects on subproject DBs 101a, 101b, 101c . . . 101n to identify execution date rules and project definition rules. The project definition rules identify what aspects of the project should be displayed or reported. These may include data relating to specific sites, buildings, locations, types of units migrated. These are displayed with their associated project completion information, such as EV. This is described in more detail in connection with the description of the other figures.

The system further comprises an overall rollup database 117 which is capable of storing the project completion information from all subproject DBs in array 101. This database may be at the same location as one or more of subproject DBs 101, or at a different, remote location. If remote, it may be connected via an appropriate network.

A rollup agent 119 may be run on the same processor as the scheduled agent 111 and/or on demand agent 113, or run on a different processor. This processor may be located in the same location of the rollup agent, or be connected via a network to rollup database 117. The rollup agent is a scheduled agent that has been initialized with the predetermined execution date rules. When activated, rollup agent 119, functions to update rollup database 117 with information from all subproject DBs 101a, 101b, 101c . . . 101n to produce one complete set of project information. Even though each of subproject DBs 101a, 101b, 101c . . . 101n is constantly being updated, rollup database 117 is current as of its last execution date.

Rollup agent 119 uses the information acquired to create a database view in a very similar manner to that of the on demand agents 113 of FIG. 1. Since the rollup database has one additional hierarchy level, corresponding to the subproject entries, this database view will display one additional hierarchy level than the database view of on demand agents 113.

Rollup agent 119 may also create project-wide reports and store them in rollup database 117.

Figure 2:
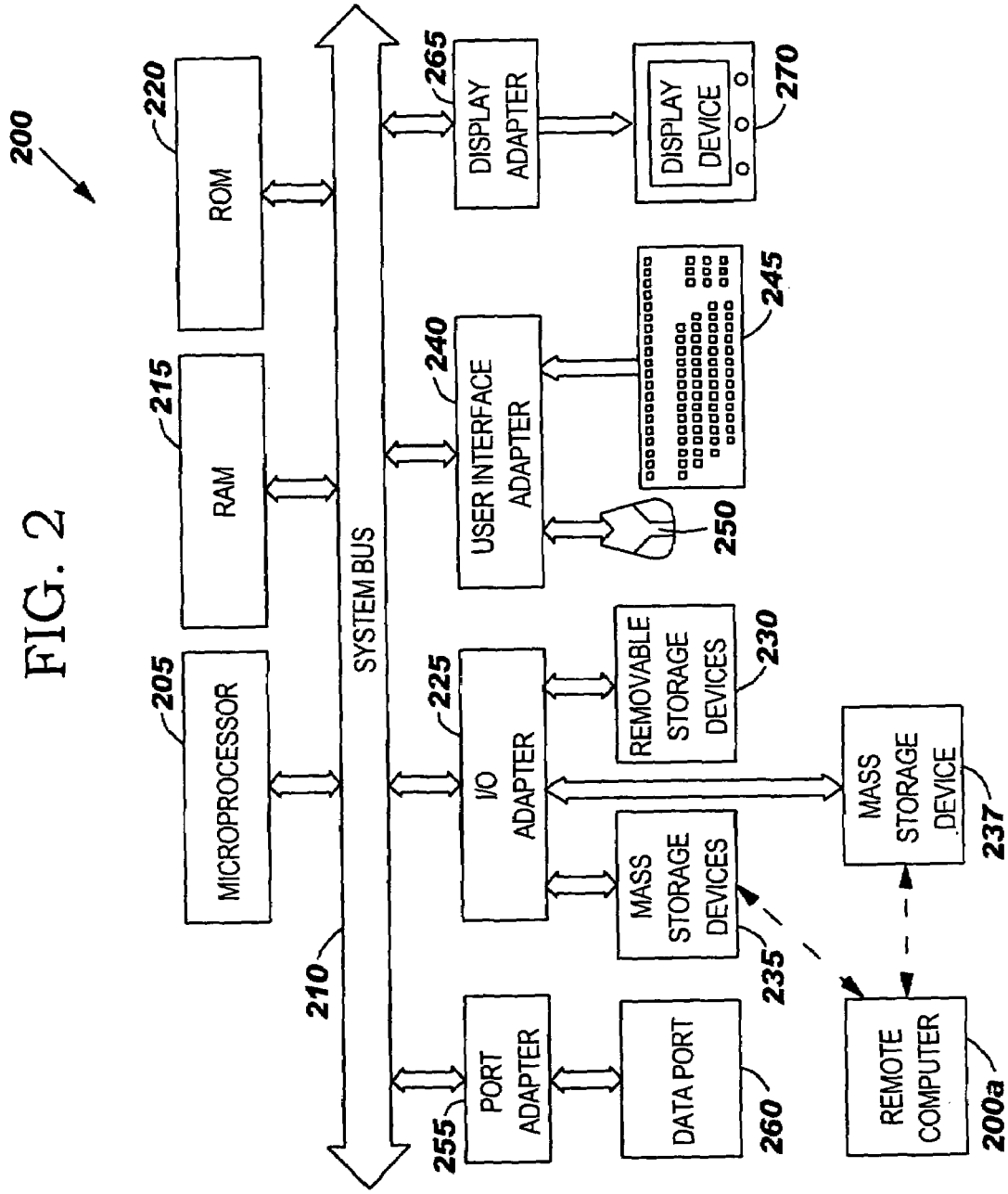
FIG. 2 is a simplified block diagram of a computer system capable of implementing the present invention.

FIG. 2 shows a schematic block diagram of a general-purpose computer for practicing the present invention.

Generally, the functions of all of the agents, the databases, or active elements of FIG. 1, including novel methods performed by the present invention described herein, may be practiced on one or more general-purpose computers 200, 200a. Wherein the methods may be coded as a set of machine-readable instructions and stored on removable or hard disk media for use by the general-purpose computer. FIG. 2 is a schematic block diagram of a general-purpose computer for practicing the present invention. In FIG. 2, a computer system 200 has at least one microprocessor or central processing unit (CPU) 205. CPU 205 is interconnected via a system bus 210 to a random access memory (RAM) 215, a read-only memory (ROM) 220, an input/output (I/O) adapter 225 for communicating with a removable data and/or program storage device 230 and a mass data and/or program storage devices 235, 237. These mass storage devices will store the information from subproject DBs 101 and rollup database 117, respectively (FIG. 1). It is also connected to a user interface adapter 240 for connecting a keyboard 245 and a mouse 250, a port adapter 255 for connecting a data port 260 such as a network interface adapter (NIC) and a display adapter 265 for connecting a display device 270. The NIC may be used to connect to remote databases and computers.

ROM 220 contains basic operating system instructions for computer system 200. The operating system may alternatively reside in RAM 215 or elsewhere as is known in the art. Examples of removable data and/or program storage device 230 include magnetic media such as floppy drives and tape drives and optical media such as CD ROM drives. Examples of mass data and/or program storage devices 235, 237 include one or more hard disk drives and nonvolatile memory such as flash memory. These may be local or remote, directly connected, or connected through a network. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT), plasma displays and liquid crystal displays (LCD).

A computer program may be created by one of ordinary skill in the art and stored on the system or a data and/or program storage device 230, or fed into the computer through a data port 260 and executed to practice the present invention.

It is also possible to have one or more other computers 200a linked to share some or all of the resources of computer 200.

While FIG. 2 shows the computer system 200 as a particular configuration of hardware and software, any configuration of hardware and software, as would be known to a person of ordinary skill in the art, may be utilized for the purposes stated above in conjunction with the use of computer system 200 of FIG. 2.

Figure 3:
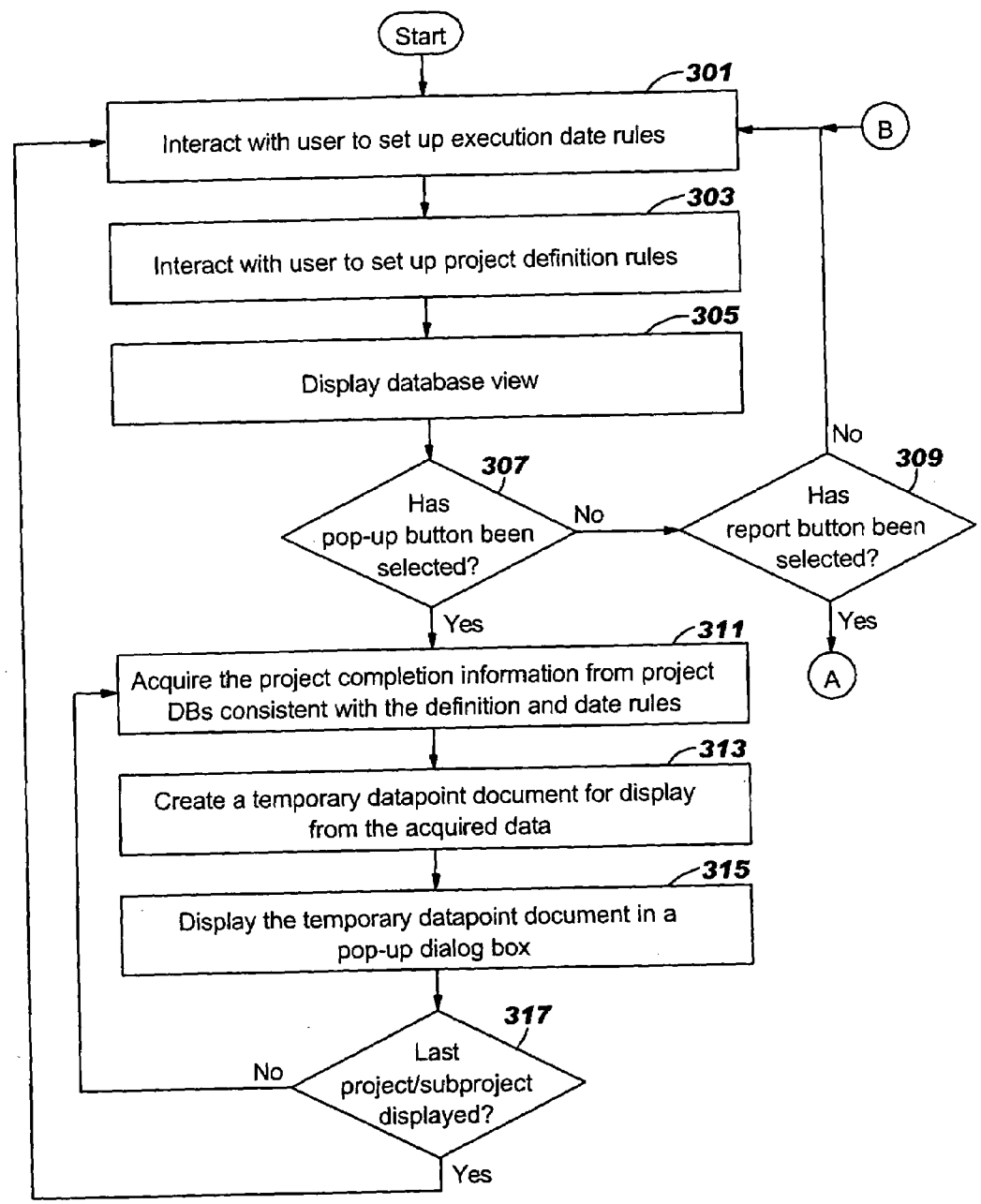
FIGS. 3 and 4 together are a flowchart showing the functioning of the rollup agent and the scheduled agent of the present invention.
Figure 4:
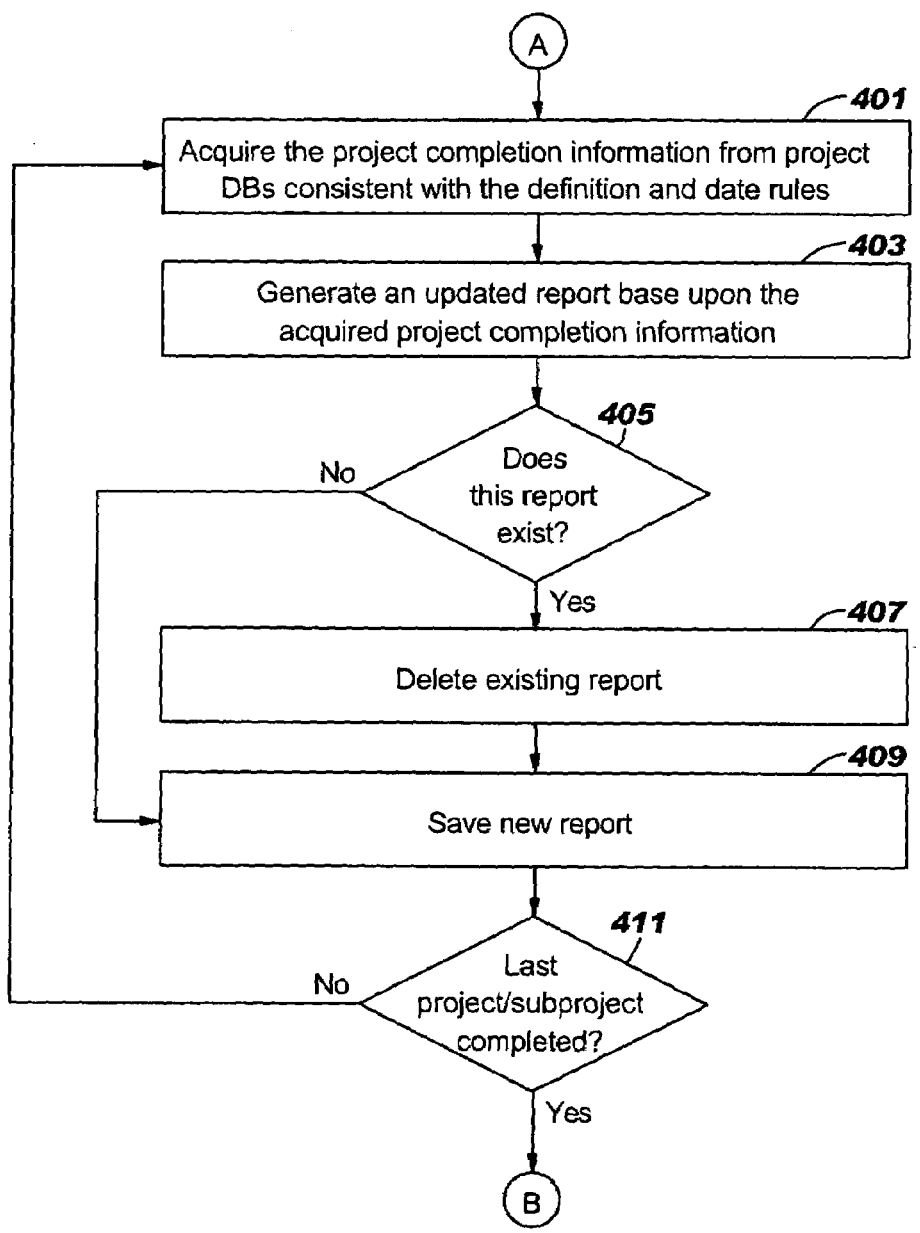

In FIGS. 3 and 4 together show a simplified flow chart of the functioning of on demand agents 113 (FIG. 1), and rollup agent 119. At a local site a user 115 interacts with on demand agent 113 to define portions of the subproject DB in which they are interested in viewing in steps 301 and 303. In step 301, execution date rules are interactively defined indicating the dates of interest in the subproject DBs. These may include dates of migration of various units at different sites or buildings. In Step 303 user 115 identifies aspects of the project which user 115 would like to have displayed or on which user 115 would like report to be generated.

The database view is displayed in FIG. 3, step 305. Once this has been displayed to user 115 (FIG. 1), the system determines if user 115 has selected a preview pop-up button in step 307. If the preview pop-up button is selected, the answer is "yes" and processing continues at step 311. If the answer is "no", processing continues at step 309.

In step 311, on demand agent 113 (FIG. 1) extracts project completion information from subproject DBs 101 fitting the project definition and execution date rules identified by the user 115.

The extracted project completion information is then used to set up a temporary datapoint document in step 313.

In step 315 this temporary datapoint document is displayed in a pop-up dialog box.

In step 317, these pop-up summaries of reports may be calculated for a plurality of projects or subprojects identified in the project definition rules.

If the preview pop-up button is not selected in step 307, then in step 309 it is determined if a report button has been selected. If the report button has not been selected, ("no"), then processing continues at step 301, if "yes", it has been selected, processing continues at step 401 of FIG. 4.

In step 401 of FIG. 4, on demand agent 113 (FIG. 1) then acquires project completion information from the subproject DBs 101.

In step 403, a report is generated from the acquired data to identify the project completion status. These, preferably, are created in a typical spreadsheet format. In step 405, it is determined if the report already exists. If an old report does exist, the answer is "yes", and processing continues at step 407. If the answer if "no", then step 409 is executed without executing step 407. In step 407, the old report is deleted. In step 409, the newly created report is saved in one of subproject DBs 101 (FIG. 1).

The on demand agents 113 (FIG. 1) and scheduled agents 111 only report on the subproject information and do not have the capability for project-wide reporting. Rollup agent 119 has that capability. Once rollup agent 119 has gathered the data from all of the subproject DBs 101, rollup agent 119 can now put together a view very similar to the on demand agents 113, but for the entire project. Therefore, rollup agent 119 performs the same steps specified above in FIGS. 3-4, but performs them on the rollup database 117.

Figure 5:
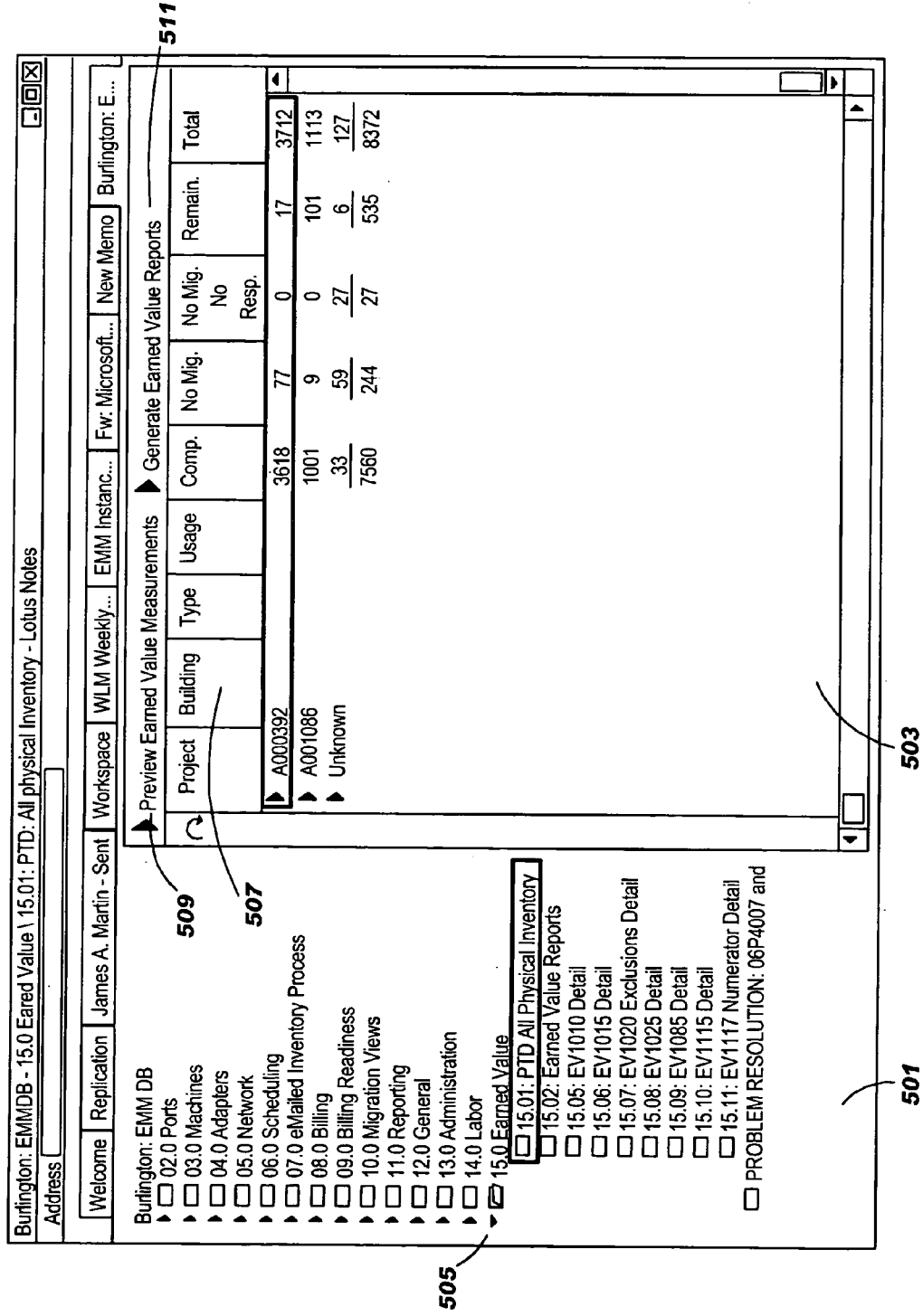
FIG. 5 is an illustration of the display of the present invention showing a database view of the project completion information.

This results in a database view having an additional hierarchy level over that of the individual subproject DBs, as shown in FIG. 5.

FIG. 5 is an illustration of the display of the present invention, or a "screen shot" showing a database view of the project completion information accumulated from subproject DBs 101a, 101b, 101c . . . 101n (FIG. 1) and stored in rollup DB 117.

On the left of this database view is a first pane 501, with a second pane 503 shown on the right. The information in the right pane shows the next lower level of the hierarchical data of the item highlighted in the left pane, "15.01 P T D. All Physical Inventory". A project administrator 121 (FIG. 1) at a computer highlights an item by navigating a cursor on the display device 270 (FIG. 2) to the item and then clicking mouse 250. As soon as administrator 121 (FIG. 1) selects an item, the entries of the next lower hierarchical level are displayed in another pane.

In the left pane 501 of FIG. 5, there is an input object, such as an 'expand' button 505 associated with each of the items. When administrator 121 clicks on an expand button 505, the entries of the next lower level appear below it in an indented form, as shown here. Since this is a toggle button, clicking on the expand button again causes items of the next lower level to disappear from the display. Expand buttons 505 may appear in any of the panes for items having a lower hierarchical level beneath them.

Even though this database view is being described with reference to two panes, any number of panes may be used.

In pane 503 (and other subsequent panes), items are listed vertically below each other with column headings 511 running from left to right indicating information common to the items shown. In this embodiment, three projects are shown indicating the number of computers in the project, the number that have been migrated, and the number that have been migrated with other migration information.

A user may select items on the database view to define aspects of the database to view. These will be used as the project definition rules. Rollup agent 119 (FIG. 1) employs the project definition rules and execution date rules which will be used to select data from rollup DB 117 for rollup agent 119. (A similar method will be used for on demand agents 113 to select data from subproject DBs 101.)

A pop-up button is shown as "Preview Earned Value Measurements" button 509. When activated it produces a pop-up dialog box as shown as overlay window 601 in FIG. 6. This was described in connection with steps 311 through 317 (FIG. 3).

A report button 511 of FIG. 5 is shown in this embodiment entitled "Generate Earned Value Report". Activating this button causes a report to be generated as described in the steps of FIG. 4.

FIG. 7 shows a sample spreadsheet format report generated according to FIG. 4.

FIG. 8 is an illustration of a database view of rollup database 117 (FIG. 1), wherein another input button 801 is displayed entitled "Earned Value Execution Dates". A user selects this button to interactively specify the execution date rules. Any of a number of known methods may be used to specify these rules.

Figure 9:
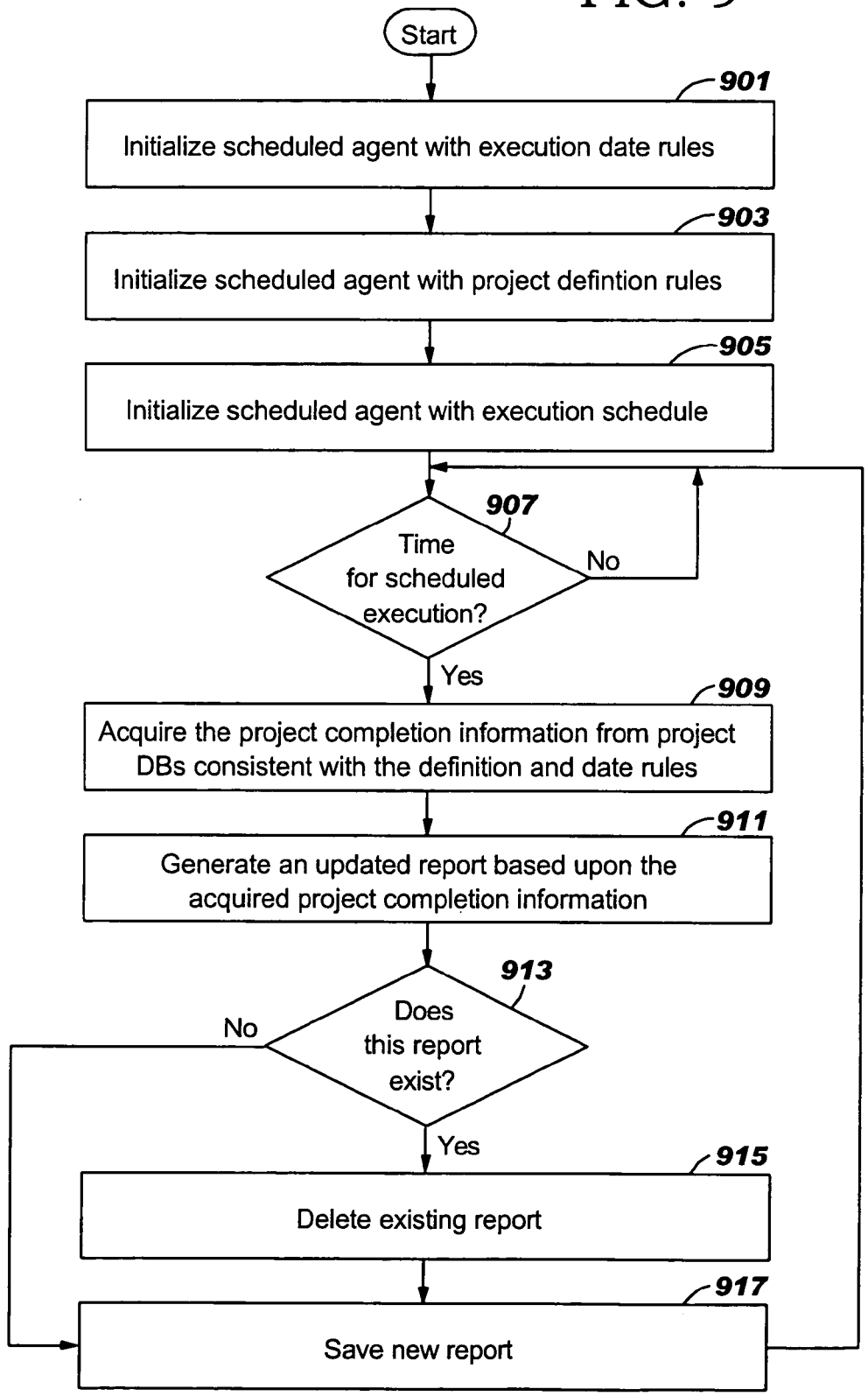
FIG. 9 is a flowchart illustrating the functioning of scheduled agents according to the present invention.

FIG. 9 is a flowchart illustrating the functioning of one of the schedule agents 113 (FIG. 1). Scheduled agent 113 (FIG. 1) has been previously initialized with execution date rules in step 901, project definition rules in step 903 and an activation schedule in step 905.

In step 907, scheduled agent 113 (FIG. 1) reads its date execution rules and compares them with the current date and time to determine if it is time to run a report. When the time and date match one of the scheduled times and dates stored in the activation schedule, the answer is "yes" and the scheduled agent is activated and begins to perform steps 909 through 919. If the answer is "no", then step 907 is repeated.

In step 909, scheduled agent 113 acquires data from subproject DBs 101 (FIG. 1).

In step 911, scheduled agent 113 generates a report based upon the acquired data.

In step 913, scheduled agent 113 (FIG. 1) determines if there is an old report for the same execution dates and project definition. If so the answer is "yes" and the report is deleted in step 915. If the answer is "no", processing continues at step 917. In step 917, scheduled agent 113 saves the new report.

Figure 10:
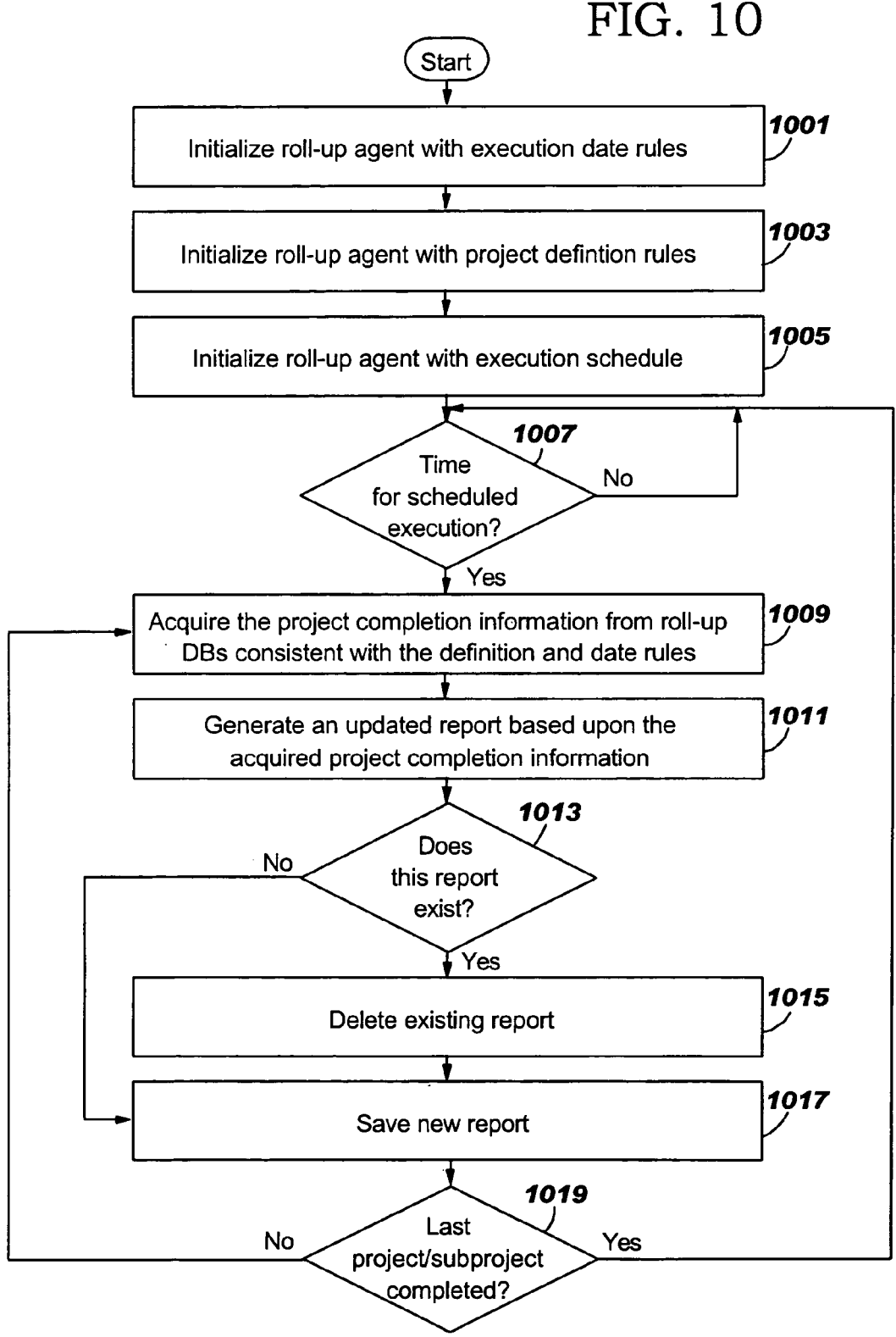
FIG. 10 is a flowchart illustrating the functioning of rollup agent functioning in its scheduled mode according to the present invention.

FIG. 10 is a flowchart illustrating the functioning of rollup agent 119 (FIG. 1) in its scheduled mode. Rollup agent 119 may also operate in a scheduled mode, similar to scheduled agents 111, and perform many steps similar to that of scheduled agents 113, but performs them on the project-wide rollup database 117.

Rollup agent 119 (FIG. 1) has been previously initialized with execution date rules in step 1001, project definition rules in step 1003 and an activation schedule in step 1005.

In step 1007, rollup agent 113 (FIG. 1) reads its date execution rules and compares them with the current date and time to determine if it is time to run a report. When the time and date match one of the scheduled times and dates stored in the activation schedule, the answer is "yes" and the rollup agent is activated and begins to perform steps 1009 through 1019. If the answer is "no", then step 1007 is repeated.

In step 1009, rollup agent 119 (FIG. 1) acquires data from rollup database 117.

In step 1011, rollup agent 119 (FIG. 1) generates a report based upon the acquired data.

In step 1013, rollup agent 119 (FIG. 1) determines if there is an old report for the same execution dates and project definition. If "yes", it deletes the old report in step 915 and saves the new report in step 917. If "no", processing continues at step 917 without performing step 915.

While embodiments of the present invention have been described herein for purposes of illustration, many modifications and changes will become apparent to those skilled in the art.

Accordingly, the appended claims are intended to encompass all such modifications and changes as fall within the true spirit and scope of this invention.

What is claimed is:

1. A method for reporting project completion information pertaining to completion of migration of project resources for each project of a plurality of projects, said method comprising:

storing and updating migration data for resources for each subproject of a plurality of subprojects of each project, wherein each subproject of each project is uniquely associated with a respective subproject database of a plurality of subproject databases comprised by a computer system such that each subproject database stores information for only the subproject that is uniquely associated with said each subproject database, wherein said storing and updating comprises storing and updating said migration data for each subproject of each project in the respective subproject database that said each subproject of each project is uniquely associated with, wherein said migration data for each subproject of each project that is stored and updated by said storing and updating comprises sites to migrate, buildings to migrate, total number of seats to migrate, total number of ports to migrate, total number of printers to migrate, total seats migrated, total ports migrated, total printers migrated, seats requiring migration, ports requiring migration, printers requiring migration, execution dates on which each subproject resource has been migrated, project planning information regarding timetables for migrating the resources of each subproject, estimates of equipment needed for migrating the resources of each subproject, financial data relating to the migration of the resources of each subproject, and budget data relating to the migration of the resources of each subproject, wherein the computer system further comprises a rollup database, an on demand agent for interacting with a user to receive information from the user and for extracting data from the subproject databases, a scheduled agent for extracting data from the subproject databases, and a rollup agent for acquiring data from the subproject databases and the rollup database and for storing data in the rollup database, and wherein the on demand agent and the scheduled agent do not have access to the rollup database;

initializing the scheduled agent with scheduled agent project definition rules that identify migration data in the subproject databases of each project for being accessed by the scheduled agent, scheduled agent execution date rules that identify dates of migration of the resources for each subproject of each project in relation to the migration data accessed by the scheduled agent, and a scheduled agent execution schedule that specifies times and dates at which the scheduled agent is to be activated;

after said initializing the scheduled agent, at times and dates specified in the scheduled agent execution schedule:

acquiring, by the scheduled agent, subproject completion information pertaining to the migration of resources of each subproject of each project from the respective subproject database that each subproject is uniquely associated with, said acquiring the subproject project completion information by the scheduled agent being in accordance with the scheduled agent project definition rules and the scheduled agent execution date rules;

generating, by the scheduled agent, a subproject report for each subproject of each project from the acquired subproject completion information of each subproject of each project, wherein the subproject report for each subproject of each project is based on the subproject project completion information acquired by the scheduled agent; and storing, by the scheduled agent in the subproject database that each subproject is uniquely associated with, the subproject report generated by the scheduled agent for each subproject of each project;

initializing the rollup agent with rollup agent project definition rules that identify migration data in the subproject databases of each project for being accessed by the rollup agent, rollup agent execution date rules that identify dates of migration of the resources for each subproject of each project in relation to the migration data accessed by the rollup agent, and a rollup agent execution schedule that specifies times and dates at which the rollup agent is to be activated;

after said initializing the rollup agent, at times and dates specified in the rollup agent execution schedule:

acquiring, by the rollup agent, subproject project completion information pertaining to the migration of resources of each subproject of each project from the respective subproject database that each subproject is uniquely associated with, said acquiring the subproject project completion information by the rollup agent being in accordance with the rollup agent project definition rules and the rollup agent execution date rules;

rolling up, by the rollup agent, the subproject project completion information acquired by the rollup agent into project completion information pertaining to the migration of resources of each project;

storing in the rollup database, by the rollup agent, the project completion information pertaining to the migration of resources of each project;

generating, by the rollup agent, a project report based on the project completion information pertaining to the migration of resources of each project; and storing, by the rollup agent, the project report in the rollup database;

receiving, by the on demand agent from the user, on demand agent project definition rules that identify migration data in the subproject databases of each project for being accessed by the on demand agent, and on demand agent execution date rules that identify dates of migration of the resources for each subproject of each project in relation to the migration data accessed by the on demand agent;

after said receiving the demand agent project definition rules and the on demand agent execution date rules:

displaying a screen shot on a display device of the computer system, wherein the screen shot depicts a view configured to display project completion information pertaining to the migration of resources for each project, and wherein the screen shot comprises a pop-up button and a report button;

detecting, by the on demand agent, a selection of the pop-up button by the user interacting with the screen shot via the display device, responsive to said detecting the selection of the pop-up button by the user:

retrieving, by the on demand agent, subproject completion information pertaining to the migration of resources of each subproject of each project from the respective subproject database that each subproject is uniquely associated with, said retrieving the subproject completion information by the on demand agent being in accordance with the on demand agent project definition rules and the on demand agent execution date rules;

creating a temporary data point document from the retrieved subproject completion information, wherein the temporary data point document comprises the retrieved project completion information for each project;

displaying, in a pop-up dialog box, the project completion information comprised by the temporary data point document;

detecting, by the on demand agent, a selection of the report button by the user interacting with the screen shot via the display device, responsive to said detecting the selection of the report button by the user:

extracting, by the on demand agent, subproject completion information pertaining to the migration of resources of each subproject of said each project from the respective subproject database that each subproject is uniquely associated with, said extracting being in accordance with the on demand agent project definition rules and the on demand agent execution date rules;

creating an updated report from the extracted subproject completion information, wherein the updated report comprises the extracted project completion information for each project; and storing the updated report in the rollup database.

* * * * *